United States Patent [19]
Bernstein

[11] Patent Number: 6,157,913
[45] Date of Patent: Dec. 5, 2000

[54] METHOD AND APPARATUS FOR ESTIMATING FITNESS TO PERFORM TASKS BASED ON LINGUISTIC AND OTHER ASPECTS OF SPOKEN RESPONSES IN CONSTRAINED INTERACTIONS

[76] Inventor: Jared C. Bernstein, 1330 Tasso St., Palo Alto, Calif. 94301

[21] Appl. No.: 09/184,804

[22] Filed: Nov. 2, 1998

Related U.S. Application Data

[63] Continuation-in-part of application No. 08/753,580, Nov. 25, 1996, Pat. No. 5,870,709.

[51] Int. Cl.$^7$ ............................. G10L 15/22; G09B 7/02
[52] U.S. Cl. ...................... 704/275; 704/270; 434/169; 434/236
[58] Field of Search .................................. 704/270, 275; 434/169, 236

[56] References Cited

U.S. PATENT DOCUMENTS

| | | | |
|---|---|---|---|
| 5,036,539 | 7/1991 | Wrench, Jr. et al. | 704/246 |
| 5,065,345 | 11/1991 | Knowles et al. | 345/302 |
| 5,255,925 | 10/1993 | Small | 463/9 |
| 5,268,990 | 12/1993 | Cohen et al. | 704/200 |
| 5,387,104 | 2/1995 | Corder | 434/156 |
| 5,393,236 | 2/1995 | Blackmer et al. | 434/169 |
| 5,458,494 | 10/1995 | Krohn et al. | 434/336 |
| 5,475,792 | 12/1995 | Stanford et al. | 704/233 |
| 5,487,671 | 1/1996 | Shpiro et al. | 434/185 |
| 5,540,589 | 7/1996 | Waters | 434/156 |
| 5,617,855 | 4/1997 | Waletzky et al. | 600/586 |
| 5,634,086 | 5/1997 | Rtischev et al. | 704/270 |
| 5,647,834 | 7/1997 | Ron | 600/23 |
| 5,810,599 | 9/1998 | Bishop | 434/157 |
| 6,006,188 | 12/1999 | Bogdashevsky et al. | 704/270 |
| 6,060,989 | 5/2000 | Gehlot | 340/576 |

FOREIGN PATENT DOCUMENTS

| | | | |
|---|---|---|---|
| WO 90/01203 | 2/1990 | WIPO | G09B 19/06 |
| WO 94/10666 | 5/1994 | WIPO | G09B 19/04 |
| WO 94/17508 | 8/1994 | WIPO | G09B 19/04 |
| WO 94/20952 | 9/1994 | WIPO | G09L 9/00 |

OTHER PUBLICATIONS

John H.L. Hansen, "Analysis and compensation of speech under stress and noise for environmental robustness in speech recognition", *Speech Communication*, vol. 20, pp. 151–173 (1996).

Diane Kewley–Port, "Speech Technology and Speech Training for the Hearing Impaired", *J. Acad. Rehab. Audiology*, (Monograph) vol. XXVII, pp. 261–264 (1994).

(List continued on next page.)

*Primary Examiner*—David R. Hudspeth
*Assistant Examiner*—Tālivaldis Ivars Šmits
*Attorney, Agent, or Firm*—Blakely, Sokoloff, Taylor & Zafman LLP

[57] ABSTRACT

Linguistic and/or extra-linguistic information is extracted from speech signals to provide measures that may then be compared to expected norms, individual baselines or other nominal or numeric criteria (according to particular psychomotor, perceptual, cognitive or emotional constructs) that are required for satisfactory performance of particular tasks, or that indicate a user's psychological or physical state. The user produces the speech signals in the context of a constrained voice-interactive dialog that utilizes prompts chosen such that the expected range of responses will exhibit low linguistic entropy. For example, the prompts may be interpreted by the user as requests for information, requests to read or repeat or paraphrase a word, sentence, or larger linguistic unit, requests to draw an inference, requests to complete, or identify elements in graphic or verbal aggregates (e.g., pictures or discourses), as examples to imitate, or any similar graphical or verbal presentation that conventionally serves as a prompt to speak. The display is presented though a device either integral or peripheral to a computer system, such as a local or remote video display terminal or telephone.

42 Claims, 6 Drawing Sheets

OTHER PUBLICATIONS

Robert L. Stout, "New approaches to the design of computerized interviewing and testing systems", *Behavior Research Methods & Impementations* vol. 13 (4), pp. 436–442 (1981).

David Thissen and Robert J. Mislevy, "Testing Algorithms," *Computerized Adaptive Testing: A Primer,* Ch. 5, pp. 103–135 (1990).

Roy C. Major, "Paragoge and degree of foreign accent in Brazilian English", *Second Language Research,* vol. 2, No. 1, pp. 51–71 (Jun. 1986).

Roy C. Major, "English voiceless stop production by speakers of Brazilian Portuguese", *Journal of Phonetics,* vol. 15, pp. 197–202 (1987).

Jack Mostow et al., "A Protype Reading Coach that Listens", *Proc. 12th Nat. Conf. Artificial Intelligence,* (AAAI–94) pp. 784–792 (1994).

Jared Berstein and Horacio Franco, "Speech Recognition by Computer", *Principles of Experimental Phonctics,* Ch. 11, pp. 408–434 (1996).

H.H. Stassen, G. Bomben and E. Günther, "Speech Characteristics in Depression[1]", *Psychopathology,* vol. 24, pp. 88–105 (1991).

Sven Anderson and Diane Kewley–Port, "Evaluation of Speech Recognizersfor Speech Training Applications", *IEEE Trans. Speech and Audio Proc.,* vol. 3, No. 4, pp. 229–241 (Jul. 1995).

PCT International Search Report for PCT/US 96/196264.

IBM Corp. 1993, "Reading Tutor Using an Automatic Speech Recognition", *IBM Technical Disclosure Bulletin,* vol. 36, No. 8 pp. 287–289 (Aug. 1993).

METHOD AND APPARATUS FOR ESTIMATING FITNESS TO PERFORM TASKS BASED ON LINGUISTIC AND OTHER ASPECTS OF SPOKEN RESPONSES IN CONSTRAINED INTERACTIONS

RELATED APPLICATIONS

This application is a continuation-in-part of U.S. application Ser. No. 08/753,580, entitled Method and Apparatus For Combining Information From Speech Signals for Adaptive Interaction in Teaching and Testing, filed Nov. 25, 1996 by Jared C. Bernstein now U.S. Pat. No. 5,870,709, issued Feb. 9, 1999.

FIELD OF THE INVENTION

The area of the present invention relates generally to voice-interactive systems using speech recognition and, more particularly, to such systems which track the linguistic, indexical and/or paralinguistic characteristics of spoken inputs to estimate the suitability or fitness of a user to perform employment duties or tasks.

BACKGROUND

Many computer systems support a function whereby a human user may exert control over the system through spoken language. These systems often perform speech recognition with reference to a language model that includes a rejection path for utterances that are beyond the scope of the application as designed. The speech recognition component of the application, therefore, either returns the best match within the language model designed for the application, or it rejects the speech signal. A good description of a variety of systems which incorporate such methods can be found in "Readings in Speech Recognition," edited by Alex Waibel and Kai-Fu Lee (1990).

Computer assisted language learning (CALL) systems for second language instruction have been improved by the introduction of speech recognition. Bernstein & Franco, ("Speech Recognition by Computer," *Principles of Experimental Phonetics*, Ch. 11, pp. 408–434, 1996) and the references therein show some examples. In most cases, the speech recognition component of the CALL system has been used as best match (with rejection) or as a scored performance for testing and skill refinement, either for nonnative speakers of the target language or for hearing-impaired speakers.

Prior laboratory demonstration systems have been designed to offer instruction in reading in the user's native language. Two systems have emulated selected aspects of the interaction of a reading instructor while the human user reads a displayed text aloud. One system based its spoken displays on the running average of poor pronunciations by the reader (see, e.g., WO 94/20952 by Rtischev, Bernstein, and Chen), and the other system developed models of common false starts, and based its spoken displays on the recognition of the occurrence of these linguistic elements. (See J. Mostow et al., "A Prototype Reading Coach that Listens," *Proc. 12th Nat. Conf. Artificial Intelligence, AAAI-94*, pp. 785–792, 1994).

Expert teachers and other human interlocutors are sensitive not only to the linguistic content of a person's speech, but to other apparent characteristics of the speaker and the speech signal. The prior art includes systems that respond differentially depending on the linguistic content of speech signals. Prior art systems have also extracted indexical information like speaker identity or speaker gender, and calculated pronunciation scores or speaking rates in reading. However, these extra-linguistic elements of human speech signals have not been used in combination with the linguistic content to estimate the speaking proficiency or other characteristics of a human user. Measurement of extra-linguistic aspects of a user's speech along with the linguistic content of the speech allows finer estimation of the human user's skill state and the user's psychological state. Finer estimation of skills or states facilitates more exact control of the operation of the computer system in a manner appropriate to the skill state of the human user and the current state of readiness of the user. Such control of computer-based graphic and audio displays is useful and desirable in order to facilitate fine-grained adaptation to cognitive, verbal and physical skill state of the human user.

In the U.S. Pat. No. 5,870,709 of U.S. application Ser. No. 08/753,580, it was shown how computer systems that interact with human users via spoken language may be improved by the combined use of linguistic and extra-linguistic information manifest in the speech of the human user. It is also known that an individual's psychological state impacts aspects of that individual's speech. For example, it has been determined that mean fundamental frequency and other extra-linguistic speech characteristics can be markers of a speaker's emotions. See, e.g., Stassen H H, Bomben G, Gunther E. Speech characteristics in depression. Psychopathology, 24:88–105, (1991).

Using such knowledge, and recognizing that other speech characteristics are considered to be important in the analysis of emotion from speech, others have proposed methods for using these speech characteristics in self-training biofeedback systems. See, e.g., U.S. Pat. No. 5,647,834. However, to date such system have relied on measures from open speaking to estimate a user's psychological state.

SUMMARY OF THE INVENTION

In one embodiment, the present invention provides a computer-assisted method that involves determining a user's fitness for a particular task based, at least in part, on one or more measures estimated from one or more spoke n responses received from the user in response to one or more prompts. Importantly, the prompts are chosen on the basis that they can be expected to elicit responses characterized by low linguistic entropy. For example, the prompts may be requests for information; requests to draw an inference; requests to read a linguistic unit; requests to repeat or paraphrase a linguistic unit; or requests to complete, fill in or identify a verbal or graphic aggregate. The measures may be linguistic and/or extra-linguistic measures. The user's fitness for the particular task may then be estimated with reference to selected constructs required for the performance of the particular task. For example, psychomotor, perceptual, cognitive and/or emotional constructs may be used.

The user's spoken responses may be received at an interactive computer system via telephone or other telecommunication or data information network. Depending on the particular system, the prompts may be graphical prompts, audio prompts, or a combination of verbal and graphical elements.

In addition to the above, the prompts may be further chosen based, at least in part, on one or more extra-linguistic and/or linguistic measures estimated from the one or more spoken responses.

In another embodiment, a computer-assisted method involves estimating states of a user from measures derived from one or more spoken responses received from the user in response to one or more prompts chosen on the basis that the prompts can be expected to elicit responses characterized by low linguistic entropy. Again the states may be estimated according to psychomotor, perceptual, cognitive and/or emotional constructs derived from the measures. Further, at least one of the prompts may be a request for information; a request to draw an inference; a request to read a linguistic unit; a request to repeat or paraphrase a linguistic unit; or a request to complete, fill in or identify a verbal aggregate.

In general, the states may be estimated from one or more linguistic, para-linguistic and/or indexical values, or various combinations thereof, derived from the user's spoken responses and/or directly provided by the user. For example, the states may be estimated from the identity of one or more linguistic units that make up the one or more spoken responses. Alternatively, the states may be estimated from one or more production quality measures derived from the spoken responses, the production quality measures being chosen from a group including the pronunciation quality, the phonological fluency, and the prosodic values of the spoken response. In still other cases, the indexical values may be chosen from a group including speaker identity, speaker native language, speaker age, and speaker gender, and these values may be estimated from the one or more spoken responses or directly provided by the user. In still other cases, other combinations of these measures may be used.

In yet another embodiment, an interactive computer-based system wherein spoken responses are elicited from a user in response to prompts presented by the system is provided. The system includes (a) means for presenting prompts chosen on the basis that the prompts can be expected to elicit responses characterized by low linguistic entropy; (b) means for extracting linguistic, indexical, or paralinguistic values in the user's spoken response; and (c) means for automatically determining a state of the user according to extracted linguistic and/or extra-linguistic values in the user's spoken response. In some embodiments, the state of the user may be determined according to at least one of a psychomotor, a cognitive, a perceptual or an emotional construct.

The means for extracting indexical or paralinguistic values may include means for extracting semaphore values including speaker identity, fundamental frequency values, speech signal amplitudes, pronunciation quality, response latency, fluency, speech rate, speaker native language, speaker age or speaker gender from the user's spoken responses. Alternatively, the means for extracting indexical or paralinguistic values may include means for extracting semaphore values including user's native language derived from the user's spoken responses in a target language.

In some cases, the means for automatically determining the state of the user may include means for comparing one or more of the extracted values from the user's spoken responses with a normative distribution. Alternatively, the means for automatically determining the state of the user may include means for comparing one or more of the extracted values from the user's spoken responses with a baseline value or distribution, or to task-related performance criteria. In still other cases, the means for automatically determining the state of the user may include means for combining two or more of the extracted values from the user's spoken responses.

The system may also include means for selecting linguistic, paralinguistic or indexical characteristics of the prompts, at least in part, according to the linguistic, para-linguistic or indexical content of one or more of the spoken responses from the user. The linguistic, paralinguistic or indexical characteristics of the prompts may include linguistic units, latency relative to the user's response, speech rate, fundamental frequency values, speech signal amplitudes, pronunciation quality, fluency, speaker identity, speaker age or speaker gender.

The prompts themselves may be requests for information, requests to draw an inference, requests to read or paraphrase one or more linguistic units, requests to repeat one or more linguistic units, or requests to complete, fill in or identify a verbal aggregate. In any or all of these cases, the prompts may be graphical prompts, audio prompts, or combinations of verbal and graphical elements. As discussed above, the spoken responses from the user may be received at the interactive computer-based system via telephone or other telecommunication or data information network.

In operation, the user produces a speech signal in the context of a computer-produced display that is conventionally interpreted by the user as a request for information, a request to draw an inference, or a request to read or repeat a word, phrase, sentence, or larger linguistic unit, or a request to complete, fill in, or identify missing elements in graphic or verbal aggregates (e.g., pictures or discourses), or an example to imitate, or any similar graphical or verbal presentation that conventionally serves as a prompt to speak. The display is presented though a device either integral or peripheral to a computer system, such as a local or remote video display terminal or telephone. The present invention extracts linguistic content, speaker identity, vocal reaction time, rate of speech, fluency, pronunciation skill, native language, and. other linguistic, indexical, or paralinguistic information from an incoming speech signal. The extracted linguistic and extra-linguistic information is combined in order to differentially select subsequent computer output for the purpose of amusement, instruction, or evaluation of that person by means of computer-human interaction. Combining these linguistic and extra-linguistic sources of information in a speech signal provides measures that mark then be compared to expected norms, individual baselines or other nominal or numeric criteria (on particular psychomotor, perceptual, cognitive or emotional constructs) that are required for satisfactory performance of particular tasks. Such levels may also be used to estimate user states that may be caused by administration of psychoactive substances or states that are associated with more general psychological conditions of the user like fatigue or depression, among others. These inferred states, in turn, may indicate suitability or unsuitability for certain activities or the performance of certain tasks.

BRIEF DESCRIPTION OF THE DRAWINGS

The present invention is illustrated by way of example, and not limitation in the figures of the accompanying drawings in which.

DETAILED DESCRIPTION

Figure 1:
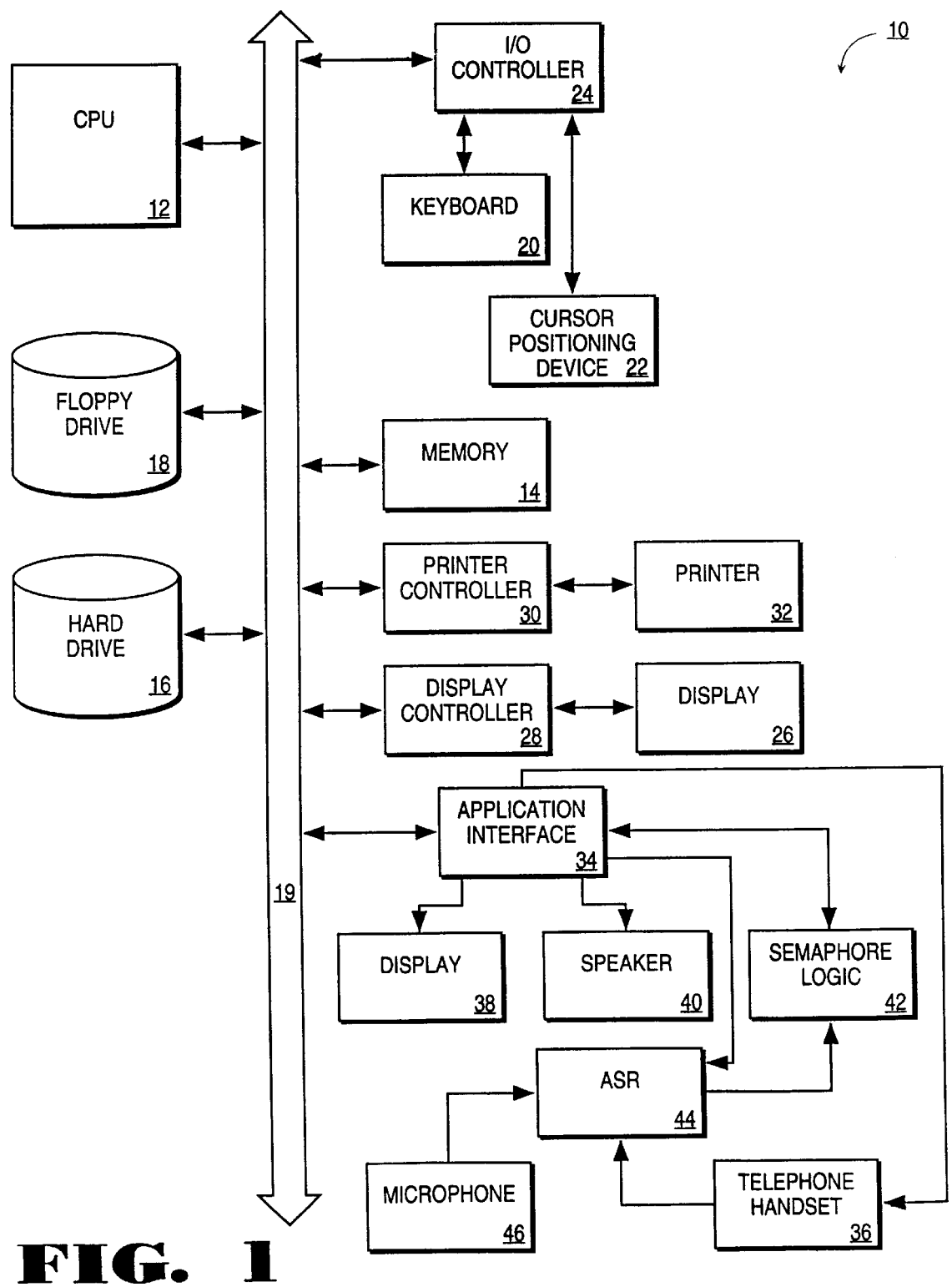
FIG. 1 illustrates a computer system which serves as an exemplary platform for the apparatus and methods of the present invention.

Described herein with reference to the above-mentioned drawings, wherein like numerals designate like parts and components, is a computer-assisted method and associated apparatus. The method and apparatus are especially useful for determining a user's fitness for a particular task based at least in part on one or more measures estimated from one or more spoken responses received from the user in response to one or more prompts. Importantly, the prompts are chosen on the basis that they can be expected to elicit responses characterized by low linguistic entropy.

In order to elicit such responses, constrained interactions with the user are initiated. Preferably, these interactions utilize a prompt-response-prompt format, with the user interacting with an automated system that presents the prompts, evaluates the responses and determines appropriate next prompts for presentation. Thus, the interactions include prompts for which the expected distribution of response word sequences or phrase sequences has relatively low linguistic entropy, that is, the responses tend to comprise relatively predictable sequences of words or sequences of other linguistic units, such as phrases.

More generally, constrained interactions, as the term is used herein, include both those with prompts for which there is a unique word sequence that is conventionally correct (e.g., "twenty four", "Larry took down five, but one at a time"), as well as those with prompts for which there may be multiple, different responses that are conventionally correct or acceptable (e.g. "fall", "autumn", "in the fall", "I think it would occur in October or November", "in the autumn", "in October", etc.). The key characteristic of constrained interactions is that the expected distribution of sequences of linguistic units is relatively limited. Thus, even with prompts that invite an open response, the responses observed in constrained interactions exhibit low linguistic entropy. If the linguistic entropy of the responses is low, then the distribution of the measures of extra-linguistic (paralinguistic and indexical) characteristics of the response are also relatively lower in entropy, and therefore can be used with greater precision and reliability to estimate construct levels and fitness for task performance or to estimate states of the speaker with reference to norms, baselines or other criteria.

The measures extracted from the responses may involve linguistic, paralinguistic and/or indexical aspects of the user's spoken responses, taken alone or in combination. Examples include the linguistic content of the response(s), the speaker's identity, the speaker's age and/or gender, the vocal reaction time of the user (i.e., the latency of the spoken response), the user's rate of speech, the phonological fluency of the response, the fundamental frequency values of the response, the speaker's pronunciation skill, the native language of the user, production quality measures of the response(s), prosodic measures estimated from the one or more spoken responses, the amplitudes of the spoken response elements, etc.

The measures obtained from the user's response(s) may then be compared to expected norms, individual baselines or other nominal or numeric criteria (according to particular psychomotor, perceptual, cognitive or emotional constructs) that are required for satisfactory performance of particular tasks. For example, if the user exhibits diminished levels of concentration and resistance to distraction (perhaps caused by fatigue), a decision can be made not to allow the user to operate machinery at that time. Causes of the user's particular performance profile in the constructs may include various psychological states and/or ingestion of psychoactive substances (e.g., alcohol, narcotics, etc.). However, the present invention is less concerned with determining the cause of the diminished or heightened capacity of the user than with the fact thereof. The use of constrained voice interactions for testing in the framework of the present invention provides a noninvasive means of estimating a user's present fitness for a particular task without raising concerns that may be present with other invasive measures such as blood and urine tests.

The psychomotor constructs referred to above may include heightened or reduced coordination, vigilance, agility, perseverance and/or endurance. The perceptual constructs may include heightened or reduced acuity, sensitivity, reactivity, alertness, selectivity and/or resistance to distraction. The cognitive constructs may involve aspects of tracking, memory, inference, language processing and/or concentration. The emotional constructs may include arousal, agitation, anger, depression, elation and/or heightened or diminished affect, among others. These and other constructs may be gauged from linguistic and/or extra-linguistic values measured in spoken responses elicited through the prompt-response-prompt format of the testing described below.

The following description sets forth numerous specific details in order to provide a thorough understanding of the present invention. However, after reviewing this specification, it will be apparent to those skilled in the all that the present invention may be practiced without these specific details. In other instances, well known structures, techniques and devices have not been described in detail so as not to unnecessarily obscure the present invention.

FIG. 1 illustrates a computer system 10 implementing the apparatus and methods of the present invention. Although the present invention can be used with any number of integrated or stand-alone systems or devices, computer system 10 represents one embodiment of the platform for the present invention.

As shown in FIG. 1, computer system 10 comprises a host CPU 12, memory 14, hard disk drive 16, and floppy disk drive 18, all of which are coupled together via a system bus 19. Upon review of this specification, it will be appreciated that some or all of these components can be eliminated from various embodiments of the present invention. It will further be appreciated that operating system software and other software needed for the operation of computer system 10 may be loaded into main memory 14 from either hard disk drive 16 or floppy disk drive 18 upon power up. It will be appreciated that some of the code to be executed by CPU 12 on power up is stored in a ROM or other non-volatile storage device.

Computer system 10 is further equipped with a conventional keyboard 20 and a cursor-positioning device 22. In one embodiment, cursor-positioning device 22 includes a trackball and two switches, which may actuated by two contoured buttons. Keyboard 22 and cursor positioning device 13 comprise part of the user interface of computer system 10 and allow a user to communicate with the other elements of computer system 10. Although any keyboard 20 and cursor-positioning device 22 could be used with computer system 10, in one embodiment, these items are distinct units which are coupled to the system bus 19 via input/ output controller 24. Other embodiments may eliminate the input/output controller and may further integrate keyboard 20 and cursor-positioning device 22 into a single unit.

Computer system 10 further includes a display unit 26, which is coupled to the system bus 19 through display controller 28. Display 26 may comprise any one of a number of familiar display devices and may be a liquid crystal display unit or video display terminal. It will be appreciated by those skilled in the art, however, that in other embodiments, display 26 can be any one of a number of other display devices. Display controller 28, which typically includes video memory (not shown), receives command and data information via system bus 19 and then provides the necessary signals to display 26, thereby accomplishing the display of text, graphical and other information to the user. When computer system 10 is in use, menus and other input/output displays which comprise part of the user interface of the computer system 10 may be displayed on display 26 and an associated cursor may be moved on the screen using cursor-positioning device 22 in the familiar fashion.

The printer functions of computer system 10 are implemented via printer controller 30 and printer 32. Printer controller 30 is coupled to system bus 19, thereby allowing for the transfer of command and data information. Printer 32 is coupled to printer controller 30 in the familiar fashion. It will be appreciated that some embodiments of computer system 10 will not utilize printer controller 30 and printer 32.

Application interface unit 34 is coupled to system bus 19 and acts as an interface between telephone handset 36, display 38 and speaker 40 and the system bus 19. Application interface unit 34 is further coupled to semaphore logic 42 which, in turn, is coupled to automatic speech recognizer (ASR) 44. Microphone 46 and telephone handset 36 are coupled to ASR 44. In operation, voice signals are converted to electrical signals by either microphone 46 or telephone handset 36. The electrical signals are then digitized and analyzed by ASR 44 in accordance with the methods of the present invention as described in detail below. The output signals of ASR 44 are passed to semaphore logic 42 which extracts values associated with the signals. These values are presented to application interface unit 34 for further processing as described below. Results of the processing are presented via display 38 and/or speaker 40 and telephone handset 36. It will be appreciated that in some embodiments display 38 and display 26 may comprise the same unit. In other embodiments, display 38 may be a dedicated unit.

Although application interface unit 34 has been depicted as a separate unit, upon review of this specification it will be apparent to those skilled in the art that the functions of application unit 34 may be implemented via host CPU 12.

Having thus described the overall computer system 10, the description will now turn to the particular methods and apparatus that comprise the present invention. Although in the description that follows, details of the implementation may be referred to as being in software, hardware alternatives may also be used, and vice-versa.

Computer systems that support spoken language interaction are based on speech recognition systems integrated with application interface logic and other components such as databases and peripherals. Computer system 10 shown in FIG. 1 is such a system. Three principal components of computer system 10: the automatic speech recognizer 44, the semaphore logic 42, and the application interface controller 34 are shown in further detail in FIG. 2. These components are directly or indirectly connected to three transducers: a video display terminal (VDT) 38, a loudspeaker 40, and a microphone 46. It will be appreciated that in other embodiments, VDT 38 may comprise an alternative type of display device such as a liquid crystal display or an active or passive display device. The components and transducers are connected by logical data streams, 50–58. The embodiment shown in FIG. 2 resembles a system in which a user interacts at a console with a VDT, microphone and a loudspeaker. However, the microphone and speaker in FIG. 2 could both be replaced by a telephone handset 36.

Figure 2:
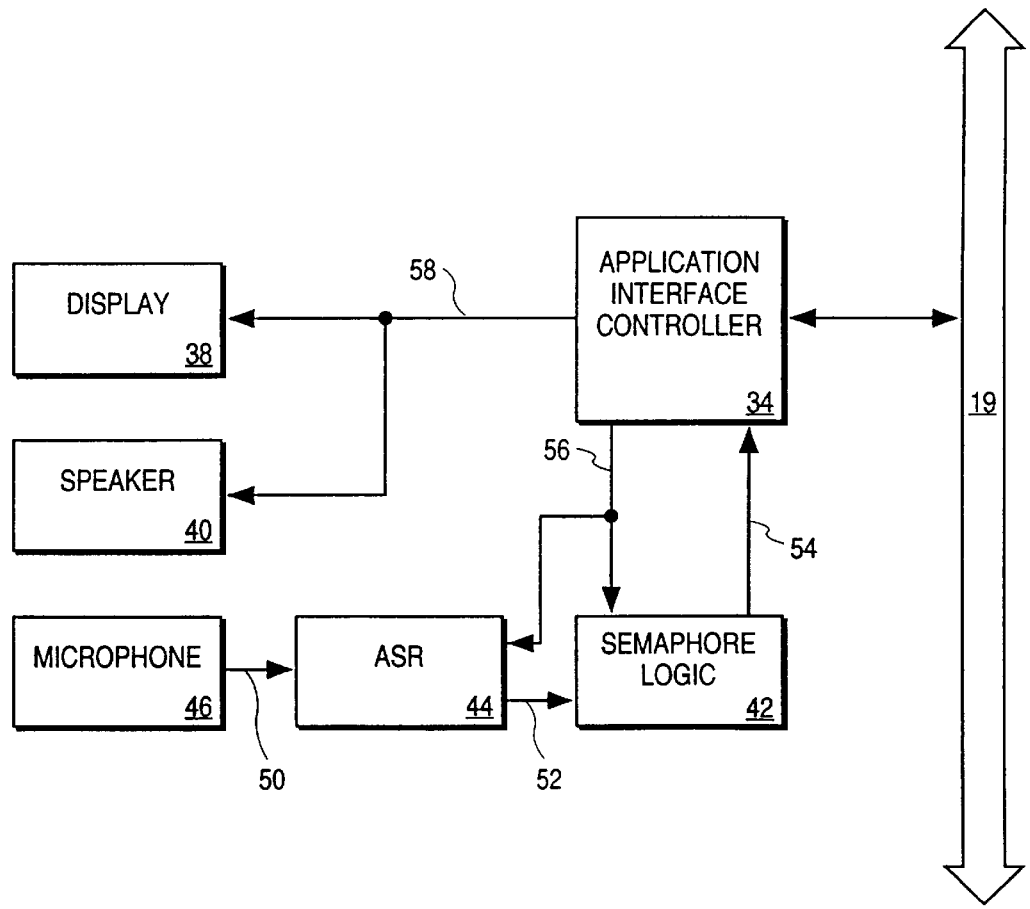
FIG. 2 illustrates the transducers and the component subsystems for speech recognition, semaphore construction, and application interface control according to one embodiment of the present invention.

A testing system that operates over the telephone is one embodiment of the invention shown in FIG. 2. In such an embodiment, the human user may be remote from the computer system 10. The computer system 10 displays speech signals over the outbound data stream 58, which is a telephone line. The user responds by speaking into the microphone 46 or the telephone handset 36. The user's speech signal is transmitted over the phone line 50, and processed by the speech recognizer 44, with reference to the current state of the application interface, as received in data stream 55 from the application interface controller 34.

The speech recognizer 44 produces a data stream 52 that contains an augmented representation of the linguistic content of the user's speech signal, including a representation of the speech signal aligned with segment, syllable, word, phrase, and clause units. The semaphore logic 42 is implemented as a sequentially separate processing component in the embodiment shown in FIG. 2, although its function may also be performed in whole or in part in the speech recognizer 44. The semaphore logic 42 extracts a series of nominal and numerical values that are associated with each unit level. This embedded semaphore structure is data stream 54 that is stored in application interface controller 34 and combined in various forms to drive the branching decisions and determine the state of the application interface controller 34. The state of the application interface controller 34 then generates two data streams: Data stream 56 that updates ASR 44 and semaphore logic 42 with its current state as relevant to the processing done in ASR 44 and semaphore logic 42, and data stream 58 that is the audio signal that plays out through the loudspeaker 40 or the user's telephone handset 36.

Figure 3:
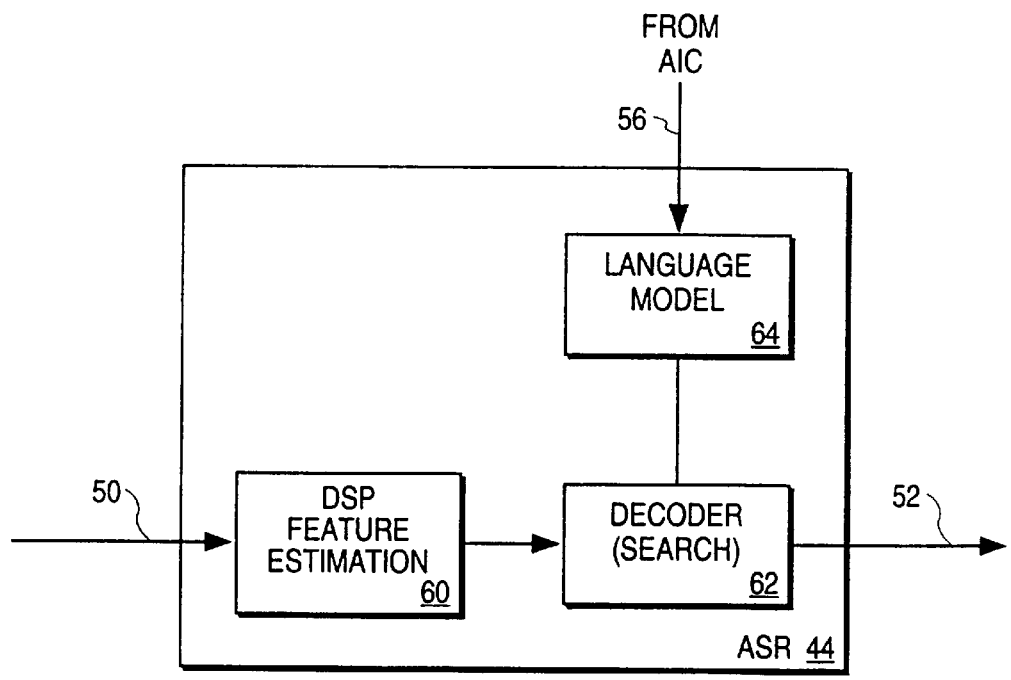
FIG. 3 shows a block diagram of the automatic speech recognition component system according to one embodiment of the invention.

FIG. 3 is a block diagram of one embodiment of a speech recognizer 44. Speech recognizer 44 is consistent with a system based on Hidden Markov Models (HMMs) for this embodiment, although the invention is applicable to systems that use other speech recognition techniques. The component comprises a feature extractor 60 that is implemented by digital signal processing (DSP) techniques well known in the art and a decoder 62 that searches the language model 64 as appropriate to the current state of the application interface controller 34.

The techniques required to implement an HMM-based speech recognizers are well known in the art. For example, U.S. Pat. No. 5,258,990 to Cohen, et al. describes such a system wherein words are modeled as probabilistic networks of phonetic segments, each being represented as one or more hidden Markov phone models. Such speech recognizers sample and process the input speech to derive a number of spectral features. Such processing is accomplished using signal analysis techniques familiar to those skilled in the art. Recognition of the speech then is achieved by solving for the state sequence that is most likely to have produced the input features.

Figure 4:
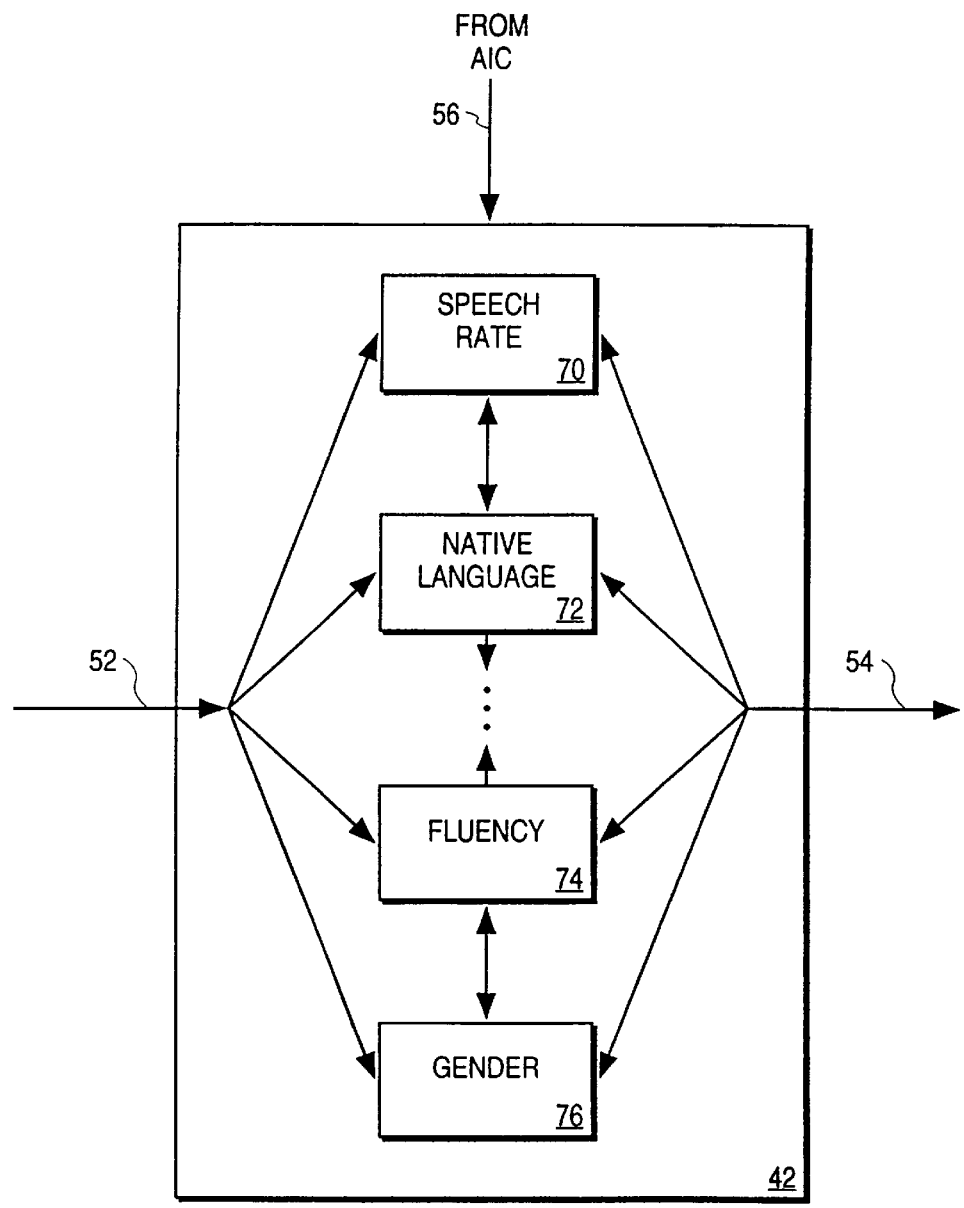
FIG. 4 shows a schematic block diagram of the logic used in constructing the semaphore fields for one embodiment of the present invention.

FIG. 4 is a schematic block diagram of the semaphore logic 42, which operates on data stream 52 and produces data stream 54. Semaphore logic 42 implements a set of estimation routines 70–76 that logically operate in parallel, with partial inter-process communication. These processes include, in the embodiment for telephone testing, measures of some or all of the following: linguistic content of the user's response(s), the speaker's identity, the speaker's estimated age and/or gender, the vocal reaction time of the user (i.e., the latency of the spoken response), the user's rate of speech, the speaker's proficiency in the language of the response, the phonological fluency of the response(s), fundamental frequency values of the response(s), the speaker's pronunciation skill, the native language of the user, production quality measures of the response(s), prosodic measures estimated from the one or more spoken responses, the amplitude of spoken response elements, etc. Each of these processes is implemented using algorithms and techniques well known in the art.

Figure 5:
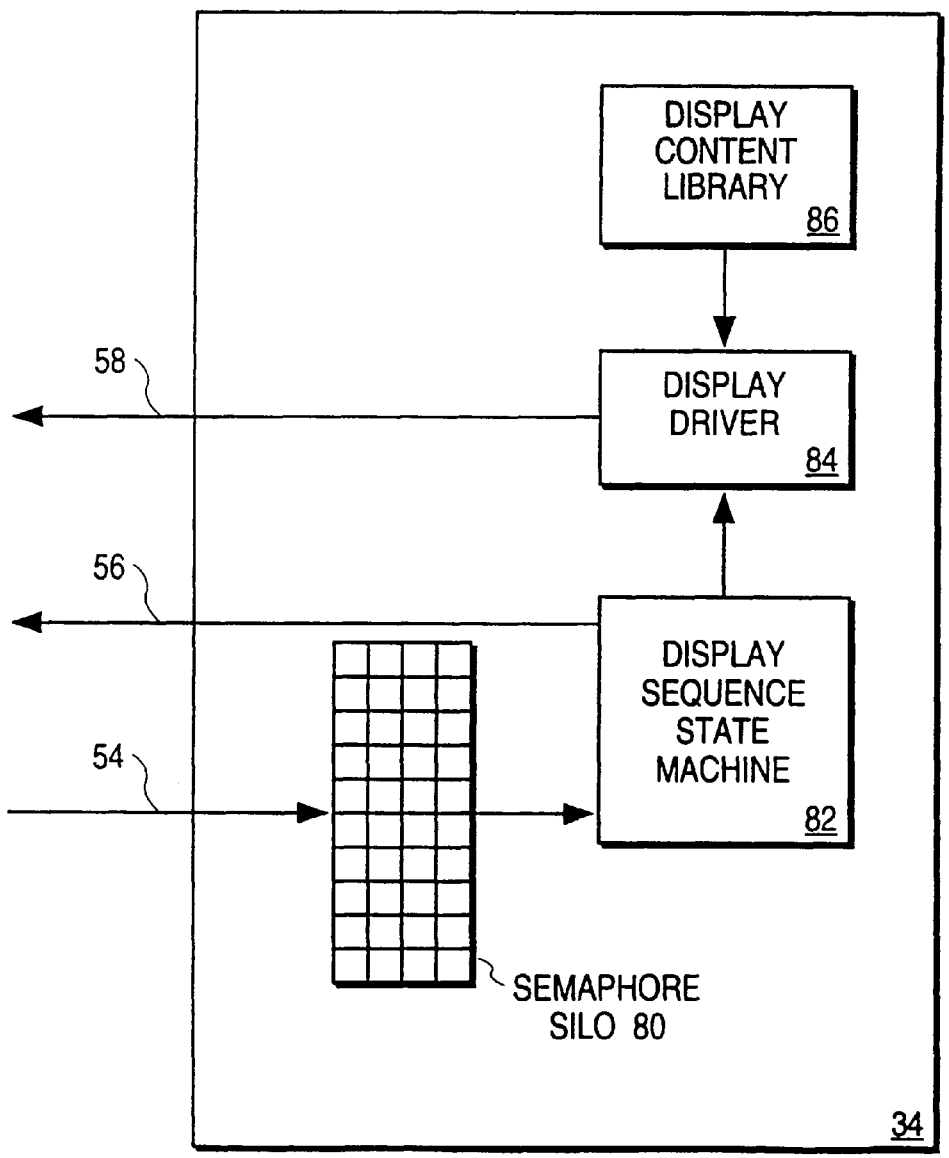
FIG. 5 shows a schematic block diagram of one embodiment of the application display controller.

FIG. 5 is a block diagram of the application interface controller 34 which comprises a semaphore silo 80, which stores a 10-utterance FIFO of semaphores, a display sequence state machine 82, a display driver 84, and a display content library 86 containing the audio files specified for display by the display sequence state machine 82. Display sequence state machine 82 changes state depending on the content of the semaphore silo 80. The current state of display sequence state machine 82 generates data stream 56 and controls the display driver 84, which copies or adapts content from display content library 86 and produces data stream 58.

Figure 6:
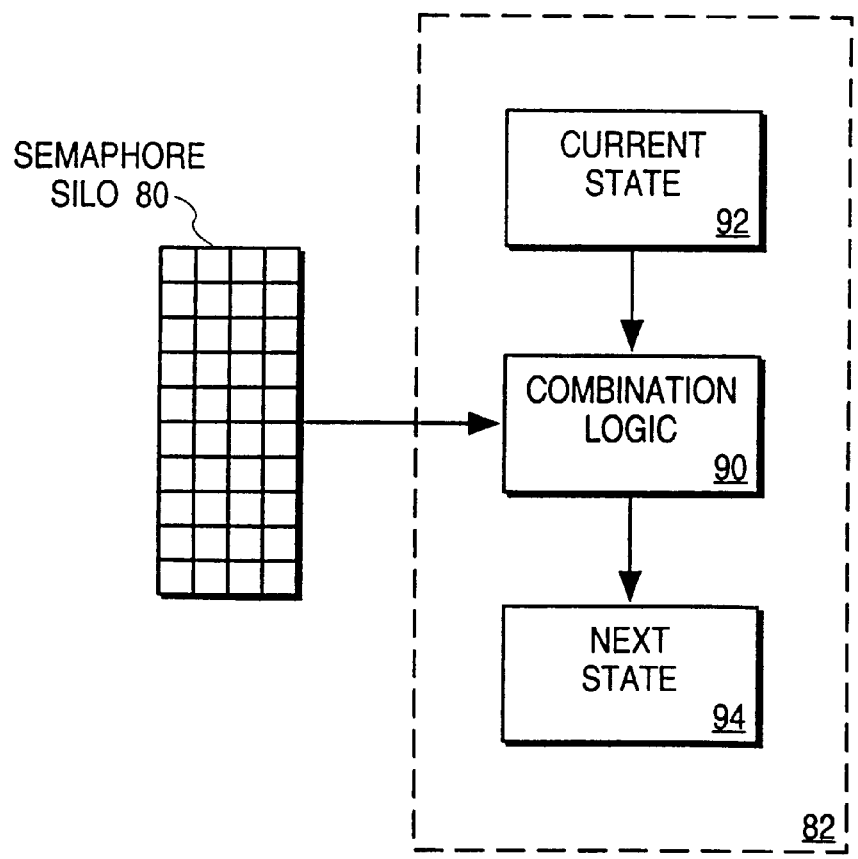
FIG. 6 is a flow diagram representing the conjoint use of semaphore fields in changing application display states.

FIG. 6 represents a decision logic element in the state network implemented in the display sequence state machine 82. The combination logic 90 in this embodiment is a deterministic, state-dependent function of the last semaphore value. Combination logic 90 allows display sequence state machine 82 to transition from current state 92 to next state 94 based on the input from semaphore silo 80. Other possibilities within the scope of the invention include probabilistic functions of the last semaphore values, and probabilistic or deterministic functions on the values of the last n (n<11) semaphores.

According to one embodiment of the present invention, a remote user initiates contact with computer system 10 via a standard telephone instrument and handset 36. It will be appreciated that this can be accomplished by dialing up a telephone number associated with computer system 10 whereupon the user's call will be automatically answered. The user initiates the operation of a desired test or other routine in the typical fashion, for example, by responding to audio prompts using the touch-tone keypad of the telephone. In response to the user input, computer system 10 may load the desired application program from hard drive 16 into main memory 14 (if such application program is not already loaded) and begins to execute the instructions associated therewith. This further causes computer system 10 to configure its circuitry accordingly so as to implement the operation of the selected application program.

Once operation has started, computer system 10 begins testing the user by generating a series of displays. These displays may be purely audio, i.e., in the case of a solely telephonic contact by the user, or audio-visual, where the user is positioned at a remote terminal or has accessed computer system 10 via a modem. It will be appreciated that one method of accessing computer system 10 may be via a gateway to the network of computer systems commonly referred to as the Internet.

Regardless of the method of connection, the displays initiated by computer system 10 may take the form of a request to read, paraphrase or repeat a word., phrase, or sentence (or larger linguistic unit); a request to draw an inference; a request to complete, fill in, or identify missing elements in a graphic or verbal aggregate (e.g., a picture or a discourse); an example to imitate; or any similar graphical or verbal presentation (e.g., a request to state the opposite) that conveniently serves as a prompt for the user to speak. Note that each of these prompts is chosen such that the range of expected spoken responses can be expected to exhibit low linguistic entropy. In response to this prompt, the user provides a speech signal, which is transmitted via the telephone handset 36 (or other device) to ASR 44. Thus, the prompt-response-prompt format of the test manifests a constrained interaction between the user and the computer system.

As described above, the user's speech signal is processed by ASR 44 to produce data stream 52. This information (data stream 52) is passed on to semaphore logic 42 where the above-described processes operate to extract the above-described linguistic, paralinguistic and/or indexical aspects of the user's spoken responses, alone or in combination.

These extracted values are then measured by application interface 34 with reference to expected norms, individual baselines or other nominal or numeric criteria to estimate the user's levels on particular psychomotor, perceptual, cognitive or emotional constructs, as these levels may be required for satisfactory performance of particular tasks. For example, the extracted values may be compared against previously established baselines for the individual user (e.g., identified through a personal identification number entered via the telephone touch-pad at the beginning of the test or spoken during the test procedure, or estimated from the spoken responses). Alternatively, the extracted values may be compared with so-called "normal" values for a particular population or with the distribution of values in the speaker population in general. These measures may then be used to determine whether the user is fit for the particular task as discussed above.

During the test procedures, the extracted information is also utilized by application interface 34 to select the subsequent output of computer system 10. This might include displaying more advanced (or simpler) graphical or verbal aggregates to those users whose spoken responses and speech characteristics demonstrate a higher (or lower) level of alertness or of another construct. Of course, it will be appreciated that other implementations of the present invention may have targets other than testing fitness for a particular task. For example, language proficiency, knowledge of historical facts or competency in arithmetic could be examined. Also, the present invention could be used as a means by which users interact with an amusement game running on computer system 10.

Thus, a novel computer implemented method and apparatus for determining a user's state or fitness for a particular task has been described. Although the teachings have been presented in connection with a particular circuit embodiment, it should be understood that the method of the present invention is equally applicable to a number of systems. Therefore, the disclosure should be construed as being exemplary and not limiting and the scope of the invention should be measured only in terms of the appended claims.

What is claimed is:

1. A computer-assisted method, comprising determining a user's fitness for a particular task based at least in part on one or more measures estimated from one or more spoken responses received from the user in response to one or more prompts chosen on the basis that the prompts can be expected to elicit responses characterized by low linguistic entropy.

2. The computer-assisted method of claim 1 wherein the measures comprise linguistic, and/or extra-linguistic measures.

3. The computer-assisted method of claim 1 wherein the user s fitness for the particular task is estimated according to selected constructs or inferred states required for the performance of the particular task.

4. The computer-assisted method of claim 3 wherein the selected constructs comprise psychomotor, perceptual, cognitive and/or emotional constructs.

5. The computer-assisted method of claim 1 wherein the prompts comprise at least one of: a request for information; requests to draw an inference; a request to read a linguistic unit; a request to repeat a linguistic unit; a request to paraphrase a linguistic unit; or a request to complete, fill in or identify a verbal aggregate.

6. The computer-assisted method of claim 1 wherein the user's spoken responses are received at an interactive computer system via telephone or other telecommunication or data information network.

7. The computer-assisted method of claim 1 wherein the prompts comprise at least one of: a graphical prompt, an audio prompt, or a combination of verbal and graphical elements.

8. The computer-assisted method of claim 1 wherein the prompts are further chosen based at least in part on one or more extra-linguistic and/or linguistic measures estimated from the one or more spoken responses.

9. A computer-assisted method, comprising estimating states of a user from measures derived from one or more spoken responses received from the user in response to one or more prompts chosen on the basis that the prompts can be expected to elicit responses characterized by low linguistic entropy.

10. The computer-assisted method of claim 9 wherein the user states are estimated according to psychomotor, perceptual, cognitive and/or emotional constructs derived from the measures.

11. The computer-assisted method of claim 9 wherein at least one of the prompts comprises at least one of: a request for information; requests to draw an inference; a request to read a linguistic unit; a request to repeat a linguistic unit; a request to paraphrase a linguistic unit; or a request to complete, fill in or identify a verbal aggregate.

12. The computer-assisted method of claim 9 wherein the spoken responses from the user are received at an interactive computer system via telephone or other telecommunication or data information network.

13. The computer-assisted method of claim 9 wherein at least one of the prompts comprises at least one of: one or more graphical prompts, one or more audio prompts, or a combination of verbal and graphical elements.

14. The computer-assisted method of claim 9 wherein the states are estimated from one or more extra-linguistic measures and one or more prosodic measures derived from the one or more spoken responses, the prosodic measures being chosen from a group including the rate of speech of the user during the period of the spoken response and the fluency of the spoken response.

15. The computer-assisted method of claim 14 wherein the states are estimated from the extra-linguistic and prosodic measures and one or more indexical values, the indexical values being chosen from a group including speaker identity, speaker native language, speaker age, and speaker gender, the indexical values being estimated from the one or more spoken responses or directly provided by the user.

16. The computer-assisted method of claim 14 wherein the states are estimated from the extra-linguistic and prosodic measures and one or more production quality measures derived from the one or more spoken responses, the production quality measures being chosen from a group including the pronunciation quality of the spoken response.

17. The computer-assisted method of claim 14 wherein the states are estimated from the extra-linguistic and prosodic measures and the identity of one or more linguistic units which comprise the one or more spoken responses.

18. The computer-assisted method of claim 14 wherein the states are estimated from the extra-linguistic measures, prosodic measures and indexical values and one or more production quality measures derived from the one or more spoken responses, the production quality measures from a group including the pronunciation quality of the spoken response.

19. The computer-assisted method of claim 19 wherein the states are estimated from the extra-linguistic measures, prosodic measures and indexical values and the identity of one or more linguistic units which comprise the one or more spoken responses.

20. The computer-assisted method of claim 19 wherein the states are estimated from the indexical values, the extra-linguistic, prosodic, and production quality measures and the identity of one or more linguistic units which comprise the ore or more spoken responses.

21. The computer-assisted method of claim 9 wherein the states are estimated from one or more extra-linguistic measures and one or more indexical values, the indexical values being chosen from a group including speaker identity, speaker native language, speaker age, and speaker gender, the indexical values being estimated from the one or more spoken responses or directly provided by the user.

22. The computer-assisted method of claim 9 wherein the states are estimated from one or more extra-linguistic measures and one or more production quality measures derived from the one or more spoken responses, the production quality measures being chosen from a group including the pronunciation quality of the spoken response.

23. The computer-assisted method of claim 9 wherein the states are estimated from one or more extra-linguistic measures and the identity of one or more linguistic units which comprise the one or more spoken responses.

24. The computer-assisted method of claim 9 wherein the prompts are further chosen based at least in part on one or more extra-linguistic and/or linguistic measures estimated from the one or more spoken responses.

25. An interactive computer-based system wherein spoken responses are elicited from a user in response to prompts presented by the system, the system comprising:

a) means for presenting prompts chosen on the basis that the prompts can be expected to elicit responses characterized by low linguistic entropy;

b) means for extracting linguistic and/or extra-linguistic values in the user's spoken response; and c) means for automatically determining a state of the user according to extracted linguistic, extra-linguistic and/or indexical values in the user's spoken response.

26. The system of claim 25 wherein the means for extracting comprises means for extracting semaphore values including speaker identity, fundamental frequency values, speech signal amplitudes, pronunciation quality, fluency, speech rate, speaker native language, speaker age or speaker gender from the user's spoken responses.

27. The system of claim 25 wherein the means for extracting comprises means for extracting semaphore values including user's native language derived from the user's spoken responses in a target language.

28. The system of claim 25 wherein the means for automatically determining the state of the user comprises means for comparing one or more of the extracted values from the user's spoken responses with an expected norm therefor.

29. The system of claim 25 wherein the means for automatically determining the state of the user comprises means for comparing one or more of the extracted values from the user's spoken responses with a baseline therefor.

30. The system of claim 25 wherein the means for automatically determining the state of the user comprises means for combining two or more of the extracted values from the user's spoken responses.

31. The system of claim 25 wherein the state is determined according to at least one of a psychomotor, a cognitive, a perceptual or an emotional construct.

32. The system of claim 25 further comprising means for selecting linguistic, paralinguistic or indexical characteristics of the prompts, at least in part, according to the linguistic, paralinguistic or indexical content of one or more of the spoken responses from the user.

33. The system of claim 32 wherein the linguistic, paralinguistic or indexical characteristics of the prompts include linguistic units, latency relative to the user's response, speech rate, fundamental frequency values, speech signal amplitudes, pronunciation quality, fluency, speaker identity, speaker age or speaker gender.

34. The system of claim 25 wherein the prompts comprise a request for information.

35. The system of claim 25 wherein the prompts comprise a request to read a linguistic unit.

36. The system of claim 25 wherein the prompts comprise a request to repeat a linguistic unit.

37. The system of claim 25 wherein the prompts comprise a request to complete, fill in or identify a verbal aggregate.

38. The system of claim 25 wherein the spoken responses from the user are received at the interactive computer-based system via telephone or other telecommunication or data information network.

39. The system of claim 25 wherein the prompts are graphical prompts.

40. The system of claim 25 wherein the prompts are audio prompts.

41. The system of claim 25 wherein the prompts combine verbal and graphical elements.

42. The system of claim 25 wherein the means for automatically determining the state of the user comprises means for evaluating selected constructs including psychomotor, perceptual, cognitive and/or emotional constructs.

* * * * *